United States Patent [19]

Kurei et al.

[11] Patent Number: 4,860,043
[45] Date of Patent: Aug. 22, 1989

[54] APPARATUS FOR KINEMATIC LINKAGE IN INTERCHANGEABLE LENS TYPE OF CAMERA

[75] Inventors: Hiroshi Kurei; Akihiro Arai; Takumi Kobayashi, all of Tokyo, Japan

[73] Assignee: Asahi Kogaku Kogyo K.K., Tokyo, Japan

[21] Appl. No.: 207,939

[22] PCT Filed: Feb. 2, 1987

[86] PCT No.: PCT/JP87/00067
§ 371 Date: Nov. 12, 1987
§ 102(e) Date: Nov. 12, 1987

[87] PCT Pub. No.: WO87/04807
PCT Pub. Date: Aug. 13, 1987

Related U.S. Application Data

[63] Continuation of Ser. No. 113,285, Nov. 12, 1987, abandoned.

[30] Foreign Application Priority Data

Feb. 5, 1986 [JP] Japan ................... 61-14483
Oct. 20, 1986 [JP] Japan ................... 61-160327

[51] Int. Cl.⁴ .............................................. G03B 3/00
[52] U.S. Cl. ................................................. 354/286
[58] Field of Search .................................... 354/286

[56] References Cited

U.S. PATENT DOCUMENTS

| Re. 32,049 | 12/1985 | Okura | 354/286 |
| 4,357,089 | 11/1982 | Okura et al. | 354/286 |
| 4,382,669 | 5/1983 | Tano et al. | 354/286 X |
| 4,420,239 | 12/1983 | Yasuyuki et al. | 354/286 |
| 4,440,484 | 4/1984 | Komoto et al. | 354/286 |
| 4,449,807 | 5/1984 | Milsi et al. | 354/286 X |
| 4,457,608 | 7/1984 | Komoto et al. | 354/286 |
| 4,506,968 | 3/1985 | Machmerth | 354/286 |
| 4,536,071 | 8/1985 | Maekawa et al. | 354/286 X |
| 4,564,265 | 1/1986 | Milsi | 354/286 X |
| 4,603,955 | 8/1986 | Haneishi | 354/286 |
| 4,653,889 | 3/1987 | Haneishi | 354/286 |

FOREIGN PATENT DOCUMENTS 3214124 12/1982 Fed. Rep. of Germany .
3234725 3/1984 Fed. Rep. of Germany .
59-42527 3/1984 Japan .

Primary Examiner—Michael L. Gellner
Attorney, Agent, or Firm—Sandler & Greenblum

[57] ABSTRACT

An apparatus for kinematic linkage in an interchangeable lens type of camera having a mount locking member (13) and a mount lock releasing member (15), on the camera body (11), in a third quadrant of a body mount (12), a joint shaft in a fourth quadrant of the body mount, integral with the mount locking member, and a kinematic linkage mechanism between the joint shaft and the mount lock releasing member on the bottom of the camera body.

39 Claims, 6 Drawing Sheets

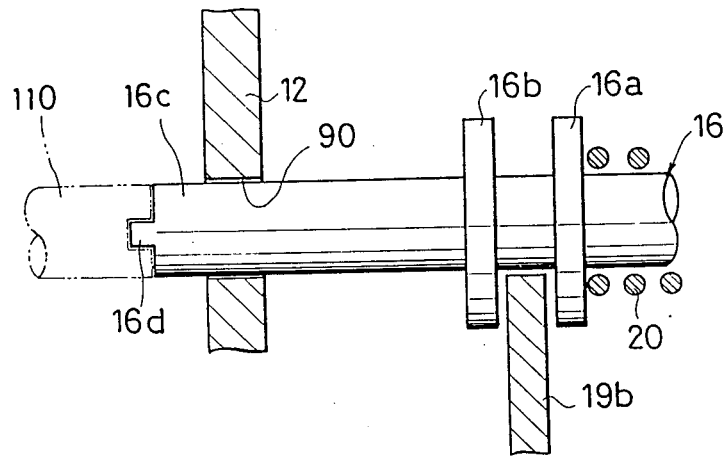
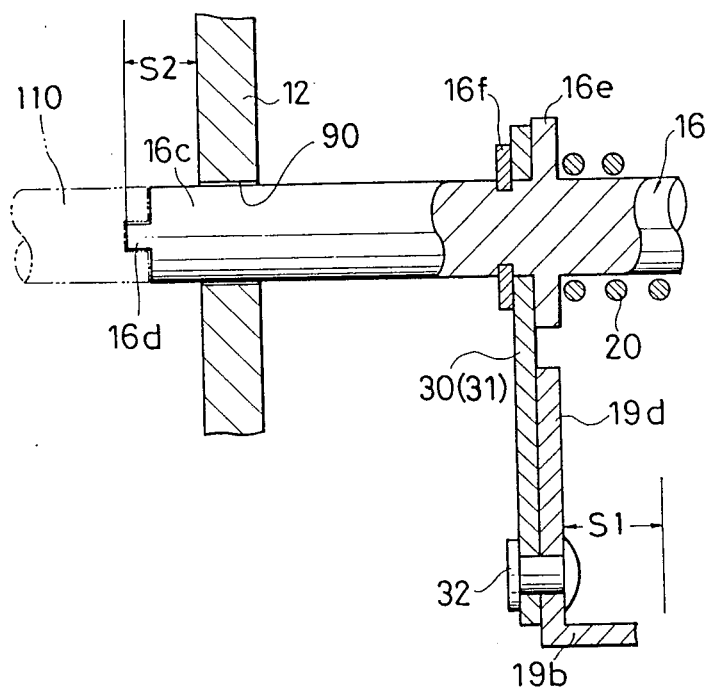

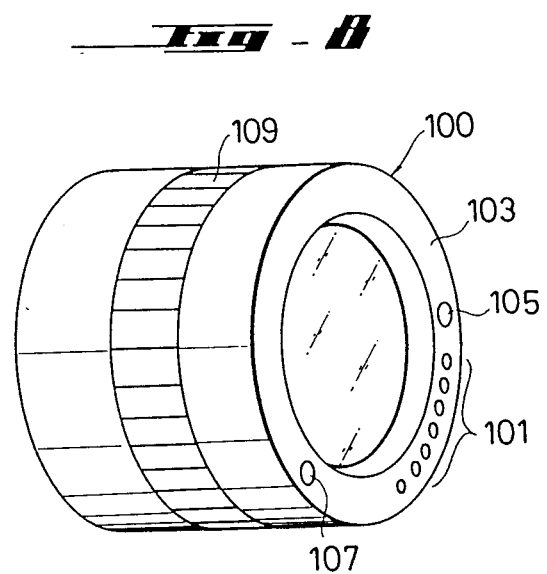

APPARATUS FOR KINEMATIC LINKAGE IN INTERCHANGEABLE LENS TYPE OF CAMERA

This application is a continuation of application Ser. No. 113,285, filed Nov. 12, 1987.

TECHNICAL FIELD OF THE INVENTION

The present invention relates to an interchangeable lens type of camera having a driving motor which forms part of a lens driving mechanism, such as an automatic focusing device, a powered zooming device, or a diaphragm actuating device, the lens driving mechanism being located in a camera body. More particularly, it relates to an apparatus for kinematically linking a driving shaft and a mount lock releasing member on the camera body such that movement of the mount lock releasing member causes the driving shaft to be projected and retracted from a mounting surface.

BACKGROUND ART

Known interchangeable lens type of cameras have a driving motor forming part of a lens driving mechanism, such as an automatic focusing device or the like, in a camera body, a joint, i.e., driving, shaft for operatively connecting a driven mechanism on the interchangeable lens with the driving motor, and a mount locking member for locking the interchangeable lens in a predetermined locking position; all of these elements are provided on a camera body mounting surface (which is referred to hereinafter as a body mounting surface). The driving shaft and the mount locking member are continuously biased into a projected position in which they project outwardly from the body mounting surface, and these elements can be retracted from the body mounting surface. Namely, when a mounting surface of the interchangeable lens (which is referred to hereinafter as a lens mounting surface) comes into contact with the body mounting surface, the driving shaft and the mount locking member are forced into the body mounting surface by the lens mounting surface such that the outer projecting ends of the driving shaft and the mount locking member will be flush with the body mounting surface. Such a flush arrangement permits the interchangeable lens to rotate on the body mounting surface.

When the interchangeable lens is rotated into a predetermined position, the driving shaft and the mount locking member project outwardly from the body mounting surface so as to come into engagement in and with a locking recess formed in the lens mounting surface, and with a lens driving member (i.e., a driven member) of the interchangeable lens, respectively.

When the interchangeable lens is removed from the camera body, a mount lock releasing member is actuated in order to force the driving shaft and the mount locking member into the body mounting surface. The lock release is preferably effected by a single lock releasing member. To this end, the driving shaft and the mount locking member are usually arranged in the same quadrant of the body mounting surface (as defined by coordinates having their origin along the optical axis of the lens, when viewed from the front of the camera body), in a conventional interchangeable lens type of camera.

This arrangement of the driving shaft and the mount locking member in the same quadrant ensures the close positioning of the driving shaft to the mount locking member, thereby resulting in the realization of a simple and compact construction of the driving shaft and of the mount locking member in association with the single mount lock releasing member.

On the other hand, a mode selection switch is usually provided in a conventional interchangeable lens type of camera in order to select an automatic focusing mode or a manual focusing mode. Additionally, in a camera having an automatic focusing device, the automatic focusing mode generally has two modes, i.e., a first mode in which the focusing operation will have priority, which is hereinafter referred to as the focusing priority mode, and a second mode in which the releasing operation has priority, which is hereinafter referred to as the releasing priority mode. In the manual focusing mode, the operator can manually adjust focusing.

In camera having a mode selection mechanism as disclosed above, the driving shaft is associated with the mode selection switch, such that the driving shaft is held in a connected position, i.e., a projected position in which the driving shaft projects from the body mounting surface and is operatively or kinematically connected to the driven member on the lens, in the automatic focusing mode, and is thus held in a disconnected position, i.e., in a retracted position in which the driving shaft is disconnected from the driven member in the manual focusing mode. Disconnection of the joint shaft from the driving member, i.e., from the distance ring, on the lens contributes to reduced power in manual operation, when in the manual focusing mode.

It is preferable to provide the mode selection switch in a location such that an operator can actuate the mode selection switch either by his or her left hand. This is because an operator usually holds a camera body with the operator's right hand, and actuates focusing, e.g., with the operator's left hand. Preferably, the mode selection switch is arranged on the right side of the camera body, and in particular in the fourth quadrant defined by the coordinates of the body mounting surface, as viewed in a front elevational view of the camera body.

On the other hand, the mount lock releasing member is usually located either in the third quadrant, i.e., the left side, or in the fourth quadrant, i.e., the right side, of the mounting surface of the camera body, since it is not usually necessary to actuate the mount lock releasing member when a photograph is being taken. When the mode selection switch is located on the right side, i.e., on the fourth quadrant, of the camera body because of the reasons mentioned above, the mount lock releasing member is preferably located on the left side, i.e., the third quadrant, in order to prevent interference, during actuation, between the mode selection switch and the mount lock releasing member.

The driving shaft and the mode selection switch should be located close to each other, because when the manual mode is selected by the mode selection switch, the driving shaft is associated with the mode selection switch in such a way that the driving shaft is retracted from the body mounting surface, as mentioned above. Specifically, if the mode selection switch is located in the fourth quadrant, the driving shaft should also be located in the fourth quadrant.

Under these circumstances, the most preferable arrangement is when the mount lock releasing member is positioned in the third quadrant, and the driving shaft and mode selection switch are provided in the fourth quadrant, thus taking the operation of these elements into consideration.

However, in this most preferable arrangement, a problem occurs in that the connecting mechanism located between the mount lock releasing member and the joint shaft is located far from the mount lock releasing member. Specifically, the problem which occurs and which needs to be solved is to provide a simple and compact connecting mechanism between the movable elements (the driving or drive shaft, the mount locking member, and the mount lock releasing member) of the camera within a limited camera space while minimizing the transmission loss.

In addition to the above, electrical contacts are normally provided on the body mounting of the camera in order to transmit and receive information (various electrical signals) between the camera body and the interchangeable lens in an interchangeable lens type of camera. These contacts are usually located on the lower portion of the mounting. The location of the contacts on the lower portion of the mounting increases the distance between the mount lock releasing member and the driving shaft, thereby making it difficult to achieve a small and compact arrangement for the connecting mechanism which is discussed above.

SUMMARY OF THE INVENTION

The primary object of the present invention is, therefore, to provide a simple apparatus for kinematically linking the driving shaft and the mount lock releasing member in an interchangeable lens type of camera in which the mount lock releasing member is located in the third quadrant and the driving shaft (and the mode selection switch) is/are located in the fourth quadrant.

Another object of the present invention is to provide a camera having a small camera body with such a kinematic linkage apparatus.

In order to achieve the objects discussed above, in accordance with the present invention, the kinematic mechanism for linking the mount lock releasing member located in the third quadrant and the drive shaft located in the fourth quadrant is provided on the bottom of the camera body.

Generally, the area located in the vicinity of the camera bottom is a dead or unused area, and, accordingly, the kinematic linkage mechanism of the present invention can be provided on the bottom of a camera body without enlarging the size of the camera body.

According to another aspect of the present invention, a connecting member (i.e., a second intermediate lever) having a movable portion which is associated with the mount lock releasing member in such a way that when the mount lock releasing member is actuated to unlock the lock releasing member, the movable portion moves in the direction of retraction of the joint shaft which is provided in the bottom of the camera body. Displacement of the movable portion of the connecting member is larger than the minimum displacement of the joint shaft which is necessary for completely retracting the joint shaft from the mounting surface. The difference in displacement distance between the drive shaft and the movable portion of the connecting member (i.e., the second intermediate lever) can be absorbed by a resilient member which connects the drive shaft and the movable portion of the connecting member. If the mode selection switch is positioned in the fourth quadrant, the elastic member can be provided with the movable portion associated with the mode selection switch and integral with the switch so that it will move together with the mode selection switch.

BRIEF DESCRIPTION OF THE DRAWINGS

FIGS. 1–4 illustrate a first embodiment of the present invention, in which FIG. 1 is a front elevational view of a camera body;

FIG. 2 is a front elevational view of the camera body of FIG. 1, with the body mounting and outer decorative member being removed/cut-away;

FIG. 3 is a perspective view of a main portion of the camera body of FIG. 1;

FIG. 4 is a sectional view taken along line IV—IV of FIG. 3;

FIGS 5–7 illustrate another embodiment of the present invention, in which FIGS. 5 and 6 are respective perspective views of main portions of the kinematic linkage apparatus of the present invention, illustrated in different operational positions;

FIG. 7 is a sectional view taken along line VII—VII of FIG. 5; and

FIG. 8 is a perspective view of an interchangeable lens.

DETAILED DESCRIPTION OF THE INVENTION

Figure 1:
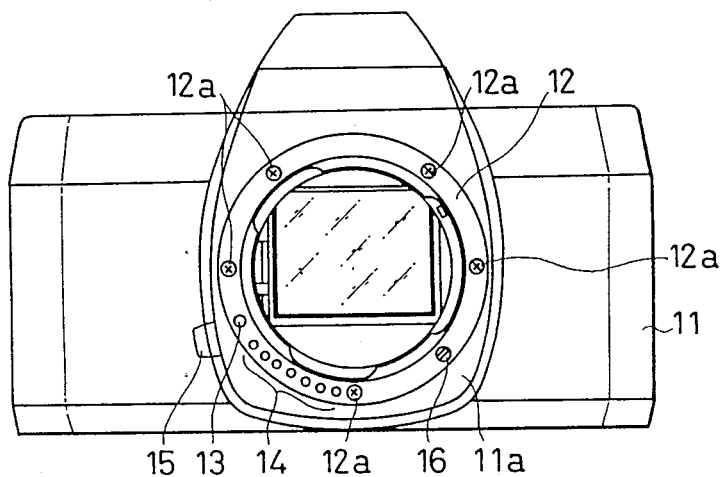
Figure 2:
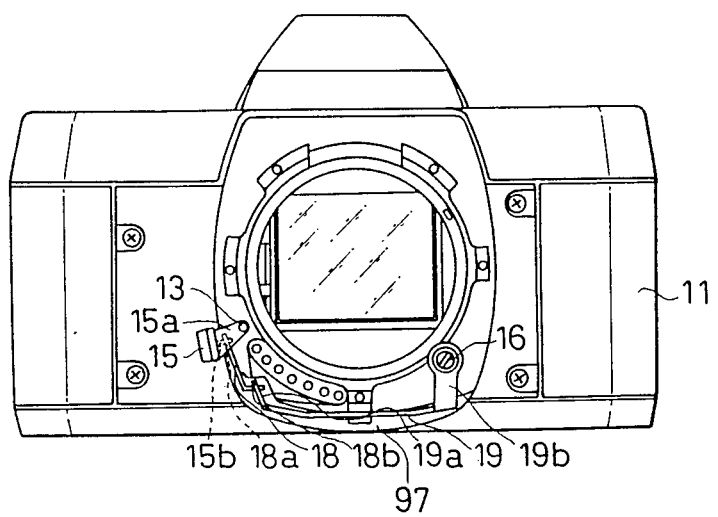

FIGS. 1–4 illustrate one embodiment of the present invention in which the invention is used in an automatic focusing camera having no mode selection switch. Further, in this first embodiment, a driven member located on the lens side which is to be driven by a driving motor incorporated in the camera body comprises a focus adjusting member, i.e., a lens.

Camera body 11 has a body mount 12 which is secured to an outer decorative member 11a on camera body 11, along a central portion of the camera body, via set screws 12a. A mount locking member 13 which is adapted to lock an interchangeable lens 100 (see FIG. 8) in a predetermined locked position is located in the third quadrant of the body mount 12, as viewed from the front, and electrical contacts 14, which are adapted to come into contact with electrical contacts 101 (see FIG. 8), provided on the interchangeable lens 100 in order to transmit and receive information, are provided on the body mount or mounting 12. The electrical contacts are provided to transmit and receive information representative, e.g., of focal length, diaphragm (F) value, or the like between the camera body and the lens. The mount locking member and the electrical contacts project outwardly from the mounting surface 99 of body mount 12. Further, in the third quadrant, the outer decorative member 11a is provided on its outer side face with a mount lock releasing member 15 for releasing an interchangeable lens which is locked by mount locking member 13. The mount lock releasing member 15 can be pushed in a direction which is parallel to the optical axis of the lens.

On the other hand, AF (Auto Focus) joint or drive (driving) shaft 16 is provided in the fourth quadrant of body mount 12 in order to connect a driving source on camera body 11 and the lens driving mechanism of the interchangeable lens.

The mount lock releasing member 15 has an arm 15a which extends parallel to the body mounting surface 99. The mount locking member 13 is secured to arm 15a. The mount lock releasing member 15 includes a guide pin 15c integral therewith, which pin is adapted to be slidably fitted in the camera body such that the mount lock releasing member 15 can move in a direction which is parallel to the optical axis. Mount lock releasing member 15 is continuously biased into a projected position in which the mount locking member 13 is projected outwardly from surface 99 of body mount 12 via a compression spring 17. Mount lock releasing member 15 is also provided with an associated pin 15b which extends perpendicularly to mount locking member 13, and which is located rearwardly of mount locking member 13.

Associated pin 15b of the mount lock releasing member 15 is engaged by a forked actuating arm 18a of a first intermediate lever 18. The first intermediate lever 18 is rotatably connected to a shaft 18c which extends in a horizontal plane which is parallel to the mounting surface. The first intermediate lever 18 extends in a substantially vertical direction, as viewed from the front, along the lower side of body mounting 12. The first intermediate lever 18 is biased by compression spring 17 so that its lower end 18b is bent to form an L-shape and tends to move rearwardly. Lower end 18b of the first intermediate lever 18 is associated with a second intermediate lever 19 which is pivotably connected to a vertical pivot shaft 19c provided on the bottom 97 of the camera body. Specifically, the second intermediate lever 19 has bent end arms 19a and 19b located at its opposite ends. These arms extend upwardly such that the lower end arm 18b of the first intermediate lever 18 is engaged by the end arm 19a of the second intermediate lever 19. The engagement between end arms 18b and 19a permits the transmission of movement in only one direction. Specifically, when end arm 18b moves, i.e., rotates forwardly, the movement of this arm is transmitted to end arm 19a of second intermediate lever 19, so that end arm 19a will move, i.e., rotate, forwardly in the same direction; but, when end arm 19a of second intermediate arm 19 moves forwardly, movement of the second intermediate lever 19 does not cause or effect any movement, i.e., rotation, of first intermediate lever 18.

Second intermediate lever 19 is engaged at its opposite bent end 19b by the AF drive shaft 16. The AF drive shaft 16 is fitted in a hole 90 (see FIG. 4) formed in body mount 12 and is fitted for both rotation and axial movement. Front end 16c of the AF joint shaft 16 has a reduced diameter, and can be retracted and projected from body mounting 12. The smaller end 16c includes a flat projection 16d on the front end face of front end 16c, so that the projection 16d can be connected to a connecting portion in the form of a groove of lens driving member 101 (see FIGS. 4 and 7) of the interchangeable lens. The AF joint shaft 16 includes a pair of flanges 16a and 16b between which the bent end 19b of lever 19 is inserted in the rear of body mount 12. The AF drive shaft 16 is biased into a position in which flange 16b bears against the rear face of body mount 12. This biasing action is effected by a compression spring 20 which is provided around AF drive shaft 16 on the portion of the shaft which is close to flange 16a. The smaller end 16c then projects from surface 99 of body mount 12.

The inner (i.e., rear) end of the AF driving shaft 16 has a non-circular sectional shape, either rectangular or ovular, and is adapted to be slidably inserted into an axial hole 93 having a corresponding sectional shape, which hole is formed in a joint gear 21 which is kinematically connected to a pinion gear 27, which gear is, in turn, attached to drive shaft 95 of driving motor 26.

The driving motor is the driving source for an automatic focusing device, via gears 22, 23, 24 and 25. Thus, driving shaft 16 can move in axial directions without effecting any relative rotation between shaft 16 and gear 21. Specifically, shaft 16 rotates together with gear 21. Alternatively, shaft 16 can be connected to gear 21 via a spline connection. In the apparatus for kinematically linking the driving shaft and the mount lock releasing member, as constructed above, an interchangeable lens can be attached to and dismounted from the camera body as detailed hereinafter.

When an interchangeable lens is mounted to camera body 11, the mounting surface of the two mounts (i.e., body mount 12 and lens mount 103) are aligned so that they are disposed in opposite fashion to each other, and are then brought into surface contact with each other such that the mount locking member and the drive shaft 16, both of which project from the surface of body mount 12, can be forced into the body mount 12 by lens mount 103 of interchangeable lens 100 (see FIG. 8) into a retracted position with the end faces of driving shaft 16 and mount locking member 13 are flush with the surface of body mount 12, against compression springs 17 and 20.

Figure 3:
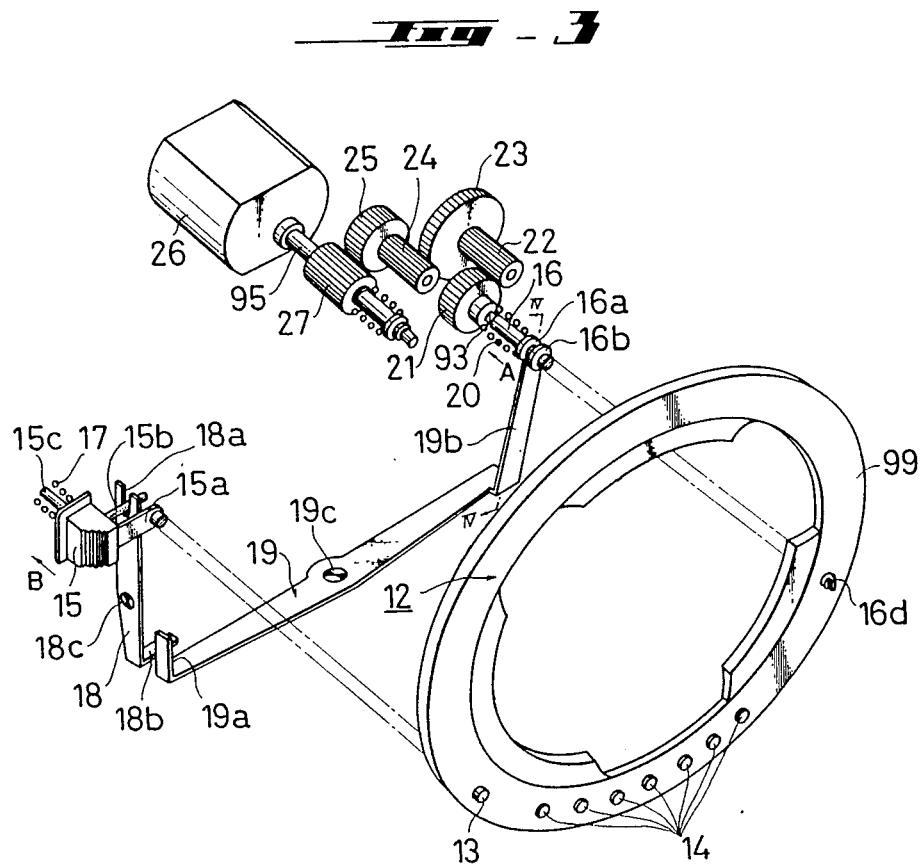

When mount locking member 13 is forced into body mount 12, mount lock releasing member 15, which is integrally connected with the mount locking member, is also moved in the same direction. Accordingly, first intermediate lever 18 rotates about shaft 18c in a counterclockwise direction, as illustrated in FIG. 3, through associated pin 15b and forked end 18a. Rotation of the first intermediate lever 18 causes forward motion of the bent end 18b. As a result of this movement of bent end 18b, the second intermediate lever 19 rotates about pivot shaft 19c such that the bent end 19b of the lever moves rearwardly. Such movement of the bent end 19b of the second intermediate lever 19 causes the AF driving shaft 16, which is associated with the second intermediate lever 19 through the flange 16a, to move in a direction which is designated or represented by arrow A in FIG. 3, against the force exerted by compression spring 20. The AF driving shaft 16, which can be directly moved rearwardly by the lens mount, can also be indirectly moved in the same direction by the lens mount through the first and second intermediate levers 18 and 19.

After lens mount 103 is mounted onto body mount 12, when the interchangeable lens 100 is rotated in a given direction in one direction by a predetermined angle, the mount locking member 13 comes into alignment with a locking hole 105 (see FIG. 8) which is provided on lens mount 103 so that the mount locking member 13 will project into locking hole 105 with the assistance of compression spring 17. In this fashion, the lens mount is locked onto the body mount. Simultaneously, the AF driving shaft 16 projects from body mount 12, with the assistance of compression spring 20, insofar as movement of the mount locking member 13 into locking hole 105 of lens mount 103 causes the first and second intermediate levers 18 and 19 to rotate about respective shafts 18c and 19c. Specifically, the force of bent end 19b which forces the AF driving shaft 16 rearwardly against compression spring 20 is released by rotation of the second intermediate lever 19 about shaft 19c in a clockwise direction, and, accordingly, the AF driving shaft 16 is moved forwardly by spring 20. When AF driving shaft 16 projects from the body mount, projection 16d of the AF driving shaft 16 engages connecting member 110 (see FIG. 4) which is provided on the automatic focusing device of the interchangeable lens, through a hole 107 which is formed in lens mount 103, so that a complete automatic focusing mechanism can be achieved. In the case of an interchangeable lens which does not include an automatic focusing device, projection 16d comes into abutment with the surface of the lens mount.

When the interchangeable lens is removed from the body mount, mount lock releasing member 15 is pushed in a direction designated by arrow B of FIG. 3, such that the mount lock releasing member 13 which is integral with the mount lock releasing member 15 will be pushed into body mount 11, and, consequently, the lock will be released. Simultaneously, the AF driving shaft 16 moves in the direction A shown in FIG. 3, since the first and second intermediate levers 18 and 19 rotate about respective shafts 18c and 19c in the same directions as the directions of rotation which result when the lens mount is mounted onto the body mount. As a result of this movement of the AF driving shaft 16, projection 16d of the AF driving shaft 16 is retracted from body mount 12. Specifically, projection 16d is disengaged from the lens mount, thereby permitting the interchangeable lens to rotate over a certain angle in a direction which is opposite to the direction of rotation effected when the interchangeable lens is mounted onto the body mount, in order to dismount the interchangeable lens from camera body 11. As soon as the interchangeable lens is dismounted from the camera body, the mount locking member 13 and the AF driving shaft 16 are projected from the body mount surface 99 by compression springs 17 and 20, respectively, such that they are returned to their respective initial positions.

Figure 5:
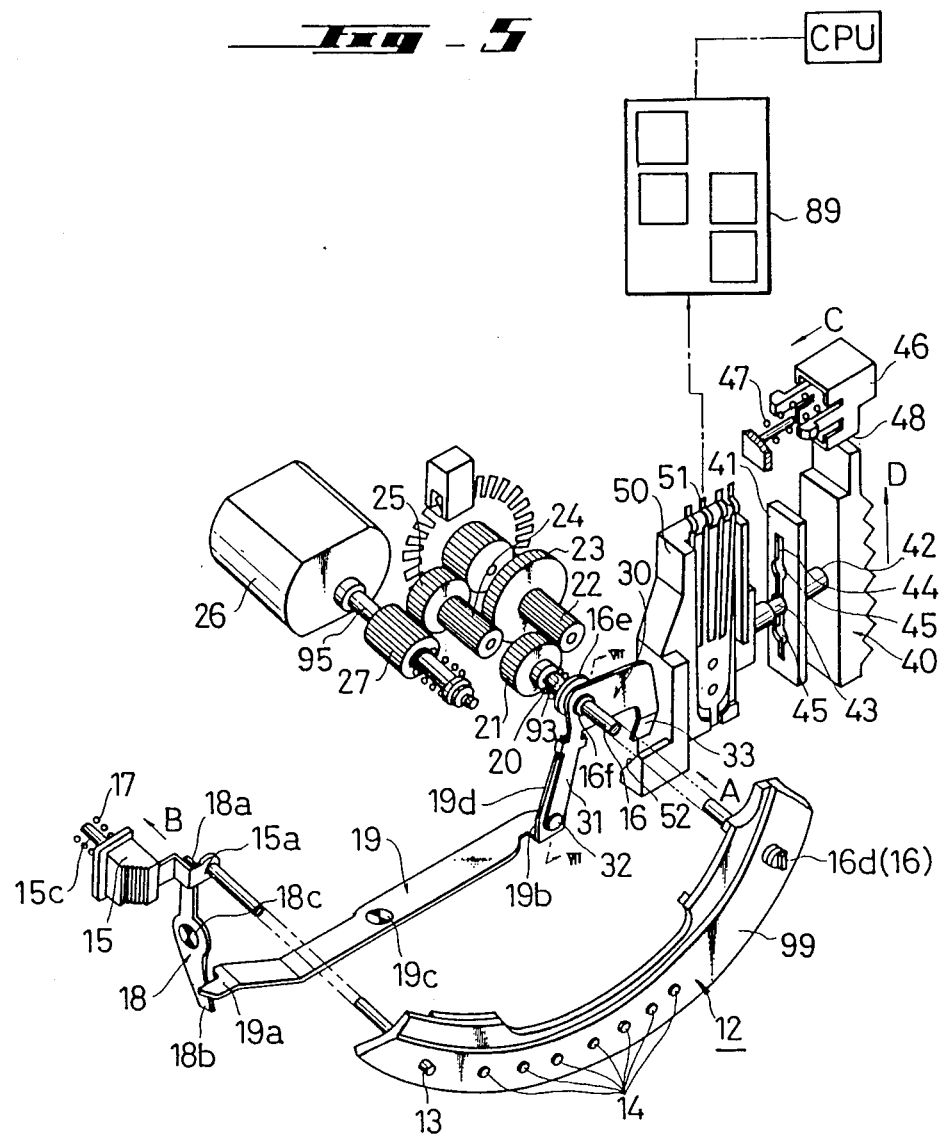
Figure 6:
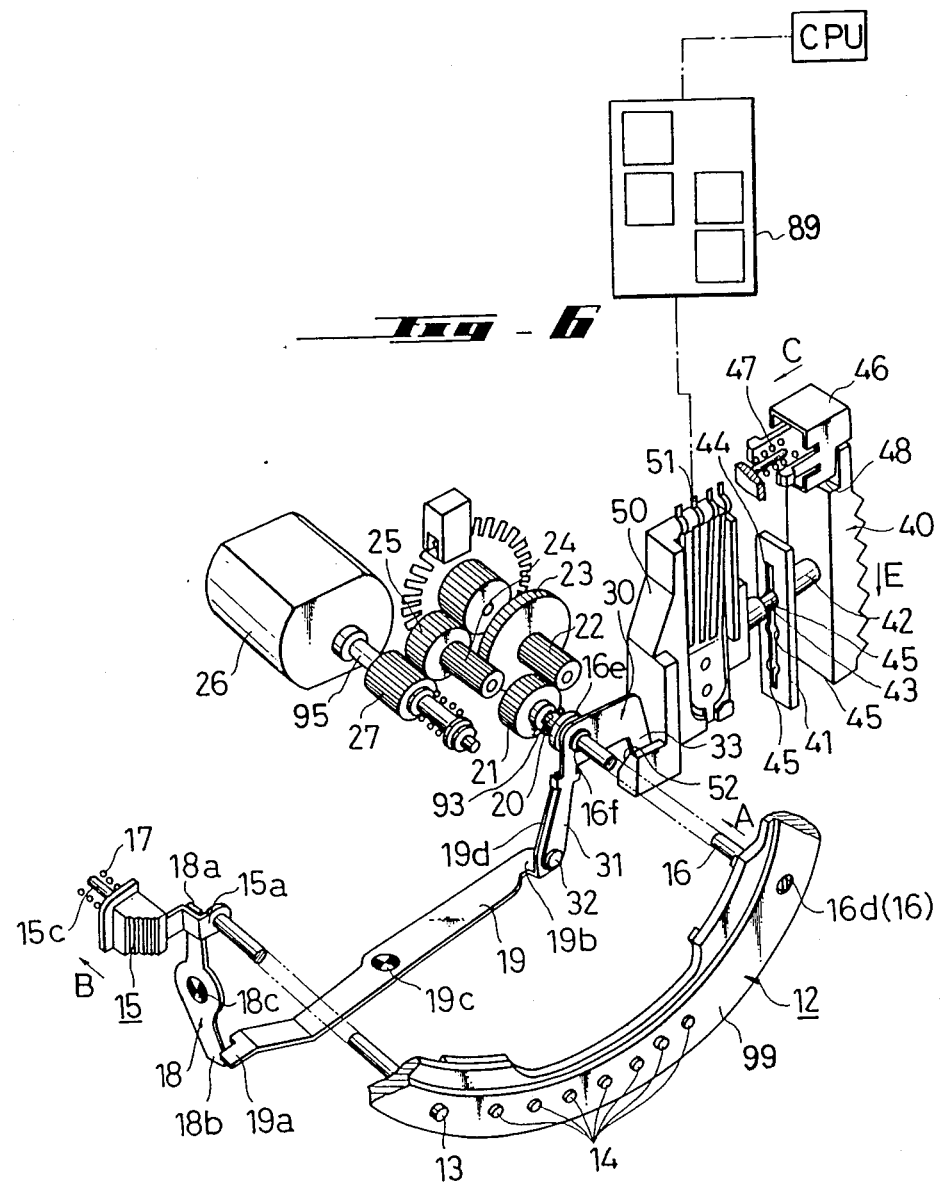

FIGS. 5–7 illustrate a second embodiment of the present invention. In FIGS. 5–7, displacement of bent end 19b of second intermediate lever 19 is larger than the minimum value which is necessary to separate projection 16d of the AF drive shaft 16 from body mount 12, such that the difference in displacement between bent end 19b and AF drive shaft 16 is absorbed by a third intermediate lever 30 with a spring member which is provided between the second intermediate lever 19 and the AF driving shaft 16. Another feature of the second embodiment which is illustrated in FIGS. 5–7 is the provision of a mode selection switch 40 in the fourth quadrant of the surface of the body mount. The mode selection switch 40 is kinematically connected to the third intermediate lever 30. Apart from the above, the embodiment illustrated in FIGS. 5–7 is fundamentally identical to the first embodiment disclosed above. Accordingly, the elements shown in FIGS. 5–7 corresponding to those in the first embodiment of FIGS. 1–4 are designated by the same reference numerals. It should be noted that the elements in the second embodiment are slightly different in shape from the elements in the first embodiment, but there is no substantial difference in function between them.

Mode selection switch 40 is slidably supported, both upwardly and downwardly, in the camera body, as illustrated in FIG. 5. The mode selection switch can occupy three positions, i.e., a top manual focusing mode position, a lower release priority mode position, and a middle focusing priority mode position, as viewed with respect to the front of the camera body. The mode selection switch 40 can be selectively clicked and maintained at these three positions by a click spring 41. Specifically, mode selection switch 40 includes a connecting shaft 42 projecting from the switch which has a smaller diameter portion 43 which is, in turn, inserted into a longitudinal groove 44 of click spring 41. Groove 44 includes three enlarged click portions 45. When the smaller diameter portion 43 of connecting shaft 42 is resiliently forced into one of click positions 45, it is then clicked.

An upper stop 46 is provided above mode selection switch and serves to limit upward movement of the mode selection switch 40 in order to prevent the mode selection switch from accidently moving into the manual focusing mode position. The upper stop 46 is movable in a direction C which is perpendicular to the longitudinal axial direction D of movement of mode selection switch 40, and the stop is continuously biased in a direction opposite to direction C, by compression spring 47, into a projected position in which the upper end of the mode selection switch 40 bears against a stop surface 48 of upper stop 46. When the upper stop 46 is pushed along direction C, against compression spring 47, stop surface 48 of stop 46 is no longer is positioned as an extension along the longitudinal axial direction D of mode selection switch 40, such that the mode selection switch 40 can move upwardly, since the upper stop 46 will no longer interfere with the upward movement of the mode selection switch. Upper stop 46 is moved into a non-operative position in which it does not interfere with movement of the mode selection switch 40 only when the mode selection switch 40 is brought into its uppermost manual focusing mode position. Connecting shaft 42 is connected to slide switching member 50 which has electrical contacts 51 attached thereto. Slide switching member 50 changes the electrical connection between the electrical contacts 51 and corresponding electrical contacts 89, which contacts are, e.g., illustrated in FIG. 5 as being connected to a central processing unit (i.e., a CPU) in the camera body, in accordance with displacement of the mode selection switch 40 in the longitudinal axial direction D. In other words, mode data of the mode selection switch 40 are input into the CPU.

In the embodiment illustrated in FIGS. 5–7, mount locking member 13 and mount lock releasing member 15 are arranged in the third quadrant of the camera body, and the AF driving shaft 16 and mode selection switch 40 are arranged in the fourth quadrant. The association between the mount lock releasing member 15 and the AF driving shaft 16, and between the mode selection switch 40 (i.e., the slide switching member 50) and the AF driving shaft 16, is detailed hereinafter.

First intermediate lever 18 is provided on the side of mount lock releasing member 15. The first intermediate lever 18 has an end arm 18a which is associated with bent arm 15a of the mount lock releasing member 15, located at the upper end of the first intermediate lever 18, so that when the mount lock releasing member 15 is pushed in direction D (see FIG. 5) against the force exerted by spring 17, the first intermediate lever 18 will rotate about pivot shaft 18c. Lower arm 18b of the first intermediate lever 18 is associated with second intermediate lever 19, which is located at the bottom of the camera body and which can rotate about the vertical pivot shaft 19c located at one end 19a of the second intermediate lever 19. The second intermediate lever 19 is connected, at its opposite end 19b, to the AF driving shaft 16, via a third intermediate member 30.

Third intermediate member 30 is connected to the AF driving shaft 16 so that it will not move along the axial direction of the AF driving shaft 16. Specifically, the third intermediate lever 30 is held between and by flange 16e, formed on AF driving shaft 16, and a snap ring 16f connected to the AF driving shaft.

Third intermediate lever 30 includes a leaf spring 31 which extends on one side of end 19b of second intermediate lever 19. The lower end of leaf spring 31 is rotatably connected to end arm 19b of second intermediate lever 19 via pin 32. End arm 19b has a reinforcing bent plate 19d which is integral with the arm and which extends along the rear face of leaf spring 31.

Leaf spring 31 normally comes into close surface contact with reinforcing plate 19d and enables AF driving shaft 16 to move rearwardly against the compression spring 20 when the second intermediate lever 19 rotates about shaft 19c, such that end arm 19b of the lever serves to move the AF driving shaft 16 rearwardly (in the direction A shown in FIG. 5). Displacement S1 of end arm 19b of the second intermediate lever 19, i.e., the angular displacement of the second intermediate lever which occurs when the mount lock releasing member 15 is pushed in the direction B, is larger than a minimum value S2 necessary for moving the AF driving shaft 16 from a projected position into a retracted position in which the driving shaft 16 is retracted from the mounting surface 99 of body mount 12, as illustrated in FIG. 7. The difference (S1–S2) can be absorbed by leaf spring 31. Specifically, leaf spring 31 moves rearwardly, together with AF driving shaft 16, until the driving shaft moves into its fully retracted position, and elastically deforms when end arm 19b further moves in the same direction in order to absorb the further movement of the second intermediate lever 19.

The third intermediate lever 30 has a bent end arm 33 which can be engaged by an inclined surface 52 of slide switching member 50. Inclined surface 52 comes into engagement with end arm 33 of the third intermediate lever 30 when the mode selection switch 40 is in the manual focusing mode position in order to push the third intermediate lever 30 against the compression spring 20, which in turn serves to retract the AF driving shaft 16 from body mount 12.

In FIG. 5, the mode selection switch 40 occupies the focusing priority mode position. In this position, inclined surface 52 of the slide switching member 50, which is connected to mode selection switch 40, is spaced apart from the end arm 33 of the third intermediate lever 30, and, accordingly, the AF driving shaft 16 projects from the body mount surface 99, with the assistance of compression spring 20, such that projection 16d can be engaged by the focus actuating member (not shown) of the interchangeable lens. Similarly, the mount locking member 13 projects from the body mounting surface with the assistance of the compression spring 17 in order to lock the two mounts together.

In this condition, when the lens mount is mounted onto the camera body, the mount locking member 13 is pushed by the surface of lens mount 103 of interchangeable lens 100 so that the mount locking member is forced into body mount 99. The front end of mount locking member 13 is then placed flush with surface 99 of body mount 12. As a result, the mount lock releasing member 15, which is integral with mount locking member 13, is also pushed, so that the first intermediate lever 18 will rotate about shaft 18c and the second intermediate lever 19 will rotate in a counterclockwise direction, as viewed in FIG. 5, about shaft 19c. Thereafter, AF driving shaft 16 is forced into body mount 12, against the force exerted by compression spring 20, by the third intermediate lever 30, which has a leaf spring 31 connected to end arm 19b. As can be seen from the above, since the displacement S1 of end arm 19b is larger than the minimum value S2 necessary to retract the AF driving shaft 16 from body mount 12, leaf spring 31 deforms so as to absorb further displacement of end arm 19b after the AF driving shaft 16 reaches its fully retracted position. Accordingly, no adjustment of the stroke of end arm 19d, i.e., no adjustment of the second intermediate lever 19, is necessary.

Thereafter, the interchangeable lens is rotated over a certain angle in order to position the mount locking member 13 into a corresponding locking hole 105 formed in the interchangeable lens, so that the interchangeable lens is locked in a predetermined position. When the mount locking member 13 is so locked, since the force by which compression spring 20 is compressed is released, AF driving shaft 16 projects from the body mount 12 so that it can be engaged by focusing actuating member 110 (see FIG. 7) of the interchangeable lens.

When the interchangeable lens is dismounted from the camera body, mount locking member 15 is pushed in direction B against compression spring 17. Since the mount locking member 13 is integral with the mount lock releasing member 13, the AF driving shaft 16 and the mount locking member 13 are forced into the body mount, in a manner similar to the manner in which they are pushed by the lens mount of the interchangeable lens. Thereafter, the interchangeable lens can be rotated, in the reverse direction, over a certain angle in order to dismount it from the camera body. The same is true when mode selection switch 40 is positioned in its releasing priority mode, i.e., in a lower mode position.

FIG. 6 illustrates a manual focusing mode in which the upper stop 46 is pushed in direction C against the force exerted by compression spring 47 so that the upper stop no longer interferes with movement of the mode selection switch 40. Thereafter, mode selection switch 40 is moved upwardly, in direction D, as illustrated in FIG. 6. Upward movement of mode selection switch 40 causes slide switching member 50, which is integral with the switch, to move in the same direction so that the inclined surface 52 of slide switching member 50 will move the third intermediate lever 30 rearwardly, in direction A, through end arm 33 of the third intermediate lever 30. As a result of the rearward motion of the third intermediate lever 30, the AF driving shaft 16 which is connected to the lever via flange 16e is moved in the same direction against compression spring 20, so that the AF driving shaft 16 will be retracted from body mount 12. Thus, the kinematic connection between the focusing mechanism of the camera body and the focusing mechanism of the interchangeable lens is broken, so that when the distance ring 109 (see FIG. 8) is manually rotated, the driving mechanism of the AF driving shaft 16 will not resist such motion, thereby resulting in a smooth manual focusing operation.

It should be clear that the electrical contacts 51 are disconnected from driving motor 26 in the manual focusing mode, so that the driving motor 26 will not be operable.

In the manual focusing mode, the second intermediate lever 19 rotates in accordance with displacement of third intermediate lever 30. However, the direction of rotation of the second intermediate lever 19 is such that end arm 19a will move away from end arm 18b of the first intermediate lever 18, and, accordingly, rotation of the second intermediate lever 19 will have no influence on the locking operation by mount locking member 13 and the lock releasing operation by mount lock releasing member 15.

When mode selection switch 40 is moved downwardly in direction E in FIG. 6, it is brought into the automatic focusing mode position from the manual focusing mode position. When the mode selection switch is moved downwardly, inclined surface 52 of the slide switching member 50 separates from end arm 33 of third intermediate lever 30, as illustrated in FIG. 5, so that the AF driving shaft 16 will project from body mount 12 due to force exerted by spring 20. This results in engagement of projection 16d of AF driving shaft 16 with the focus actuating member of the interchangeable lens. In other words, the automatic focusing mode is established in this way.

The above explanation has been directed to an interchangeable lens type of camera having an automatic focusing device. It should be easily understood that the present invention is also applicable to different types of cameras, e.g., to interchangeable lens types of cameras having a powered zooming device or a diaphragm driving device, which would result by connecting the AF joint shaft 16 to a focal length adjusting member (not illustrated) of the interchangeable lens, or to a diaphragm adjusting member (i.e., a member for adjusting the F value) of the interchangeable lens.

The present kinematic linkage apparatus used in an interchangeable lens type of camera, in accordance with the present invention, has wide applicability to interchangeable lens type of cameras having an automatic focusing device, a powered zooming device, or an automatic diaphragm adjusting device, which are driven by a driving motor provided in the camera body.

We claim:

1. An interchangeable lens type camera comprising a body to which an interchangeable lens is adapted to be connected, said camera including a driving motor positioned in said camera body for driving said interchangeable lens when said lens is connected to said body, said camera body having a body mounting surface including a mounting ring and comprising first, second, third and fourth quadrants, and a mount locking member located on said body mounting surface, said mount locking member comprising means for locking said interchangeable lens on said camera body, a driving shaft positioned adjacent to said body mounting ring, said driving shaft comprising means for transmitting rotation of said driving motor to a driven member in said interchangeable lens, biasing means for biasing said driving shaft and said mount locking member in a direction in which said shaft and said mount locking member both project from said mounting surface, a mount lock releasing member comprising means for retracting said driving shaft and said mount locking member from the body mounting surface against said biasing means, said mounting surface having a lower mounting surface portion in which said third and fourth quadrants are located, said camera further comprising means for kinematically linking said driving shaft and said mount lock releasing member, said kinematically linking means being located adjacent to said lower mounting surface portion, said mount locking member and said mount lock releasing member being positioned in said third quadrant of said mounting surface, as viewed from the front of said camera body, said driving shaft being located in said fourth quadrant of said mounting surface, said locking member being integrally attached to said mount lock releasing member.

2. A camera in accordance with claim 1, wherein said mounting ring is generally annular.

3. A camera in accordance with claim 1, wherein said camera has a bottom and said linking means is located adjacent said bottom.

4. A camera in accordance with claim 1, wherein at least a portion of said linking means is located below said mounting surface.

5. A camera in accordance with claim 1, wherein said means for kinematically linking said driving shaft and said mount lock releasing member comprises a first intermediate lever positioned in said third quadrant, said first intermediate lever being rotatable about a horizontal pivot shaft in response to movement of said mount lock releasing member, and a second intermediate lever which is rotatable about a vertical pivot shaft located within said camera body adjacent a bottom of said camera body, said second intermediate lever being adapted to move in association with rotational movement of said first intermediate lever.

6. A camera in accordance with claim 5, further comprising a third intermediate lever having an elastically deformable member positioned between said driving shaft, said third intermediate lever being positioned adjacent to said driving shaft and to said second intermediate lever.

7. A camera in accordance with claim 6, said second intermediate lever being adapted to rotate about said vertical pivot shaft over an angular displacement which is larger than a minimum value necessary to fully retract said driving shaft from said body mounting surface, said elastically deformable member comprising means for absorbing the difference in displacement between said driving shaft and said second intermediate lever.

8. A camera in accordance with claim 5, further comprising means for transmitting movement between said first intermediate lever and said second intermediate lever in only a single direction so that when said first intermediate lever rotates in response to actuation of said mount lock releasing member, said second intermediate member will rotate in association with rotation of said first intermediate lever, and when said second intermediate lever rotates in association with movement of said driving shaft, said first intermediate lever will not rotate.

9. A camera in accordance with claim 1, wherein said driving shaft includes a pair of flanges, one end of said second intermediate lever being positioned between said flanges so as to comprise means for establishing a kinematic linkage between said driving shaft and said second intermediate lever.

10. A camera in accordance with claim 1, further comprising a mode selection switch located in said fourth quadrant, said mode selection switch comprising means for selecting an automatic focusing mode for said camera in which said driving shaft is engaged with said interchangeable lens, or a manual focusing mode in which said drive shaft is disengaged from said interchangeable lens.

11. A camera in accordance with claim 1, wherein said body mounting surface includes a plurality of electrical contacts in said third quadrant, said electrical contacts being located between said mount locking member and said driving shaft for transmitting and receiving information between said camera body and an interchangeable lens.

12. A camera in accordance with claim 1, wherein said interchangeable lens driven member which is adapted to be driven by said driving motor comprises a focus adjusting member.

13. A camera in accordance with claim 1, wherein said interchangeable lens driven member which is adapted to be driven by said driving motor is a focal length adjusting member.

14. A camera in accordance with claim 1, wherein said interchangeable lens driven member which is adapted to be driven by said driving motor comprises a diaphragm adjusting member.

15. A camera body adapted to receive interchangeable lenses in releasably engaging fashion, said camera body having a front, back, top and bottom, and a mounting surface having an upper portion and a lower portion, said mounting surface being located on the front of said camera, wherein said mounting surface, as viewed from the front of the camera, has opposite left and right hand sides and a plurality of quadrants of each of said opposite sides of said mounting surface, respectively, a driving shaft comprising means for transmitting rotation of a driving motor in said camera body to a driven motor in an interchangeable lens when an interchangeable lens is attached to said camera body, said driving shaft being located in one quadrant on one of said opposite sides of said mounting surface, a mounting surface locking member and a mounting surface releasing member positioned in another quadrant on the other side of said opposite sides of said mounting surface, and means for kinematically linking said driving shaft and said mount lock releasing member, said means for kinematically linking extending between said quadrants on opposite sides of said mounting surface.

16. Apparatus in accordance with claim 15, said linking means being located below said lower portion of said mounting surface.

17. A camera body in accordance with claim 15 in combination with an interchangeable lens having electrical contacts which are adapted to engage corresponding electrical contacts on said camera body when said lens is mounted on said body.

18. A camera body in accordance with claim 15, wherein said mounting surface comprises a mounting ring.

19. A camera body in accordance with claim 15, wherein said mounting surface has first and second upper quadrants and third and fourth lower quadrants, said driving shaft being positioned in said fourth quadrant, said mounting surface locking member and said mounting surface releasing member being positioned in said third quadrant.

20. A camera body in accordance with claim 19, wherein said mounting surface includes a plurality of electrical contacts located in said third quadrant, between said mounting surface locking member and said driving shaft, said electrical contacts comprising means for transmitting and receiving information to and from corresponding electrical contacts on an interchangeable lens when said interchangeable lens is attached to said camera body.

21. A camera body in accordance with claim 15, wherein said mounting surface locking member comprises a pin adapted to extend outwardly from said front mounting surface of said camera body.

22. A camera body in accordance with claim 21, wherein said pin is mounted on said mounting surface releasing member, said mounting surface releasing member comprising a depressible member and a second pin which is generally parallel to said mounting surface, said mounting surface releasing member further comprising a spring for biasing said depressible member outwardly from the mounting surface of said camera body, said second pin being engaged by said kinematically linking means.

23. A camera body in accordance with claim 22, said kinematically linking means including a first, generally vertically arranged intermediate lever, said intermediate lever including a forked end which is adapted to engage said second pin.

24. A camera body in accordance with claim 15, said kinematically linking means comprising a first, generally vertically positioned intermediate lever, and a second intermediate lever, said second intermediate lever having first and second ends, said first end comprising a first bent arm which is adapted to selectively engage a lower end of said first intermediate lever, wherein rotation of said first intermediate lever in a substantially counterclockwise direction about a substantially horizontal axis causes said first intermediate lever lower end to contact said first bent arm of said second intermediate lever and rotate said second intermediate lever about a substantially vertical shaft.

25. A camera body in accordance with claim 24, further comprising a third intermediate lever, said third intermediate lever being positioned adjacent to one end of said second intermediate lever, said third intermediate lever being positioned on said driving shaft.

26. A camera body in accordance with claim 25, wherein said third intermediate lever includes an elastically deformable member comprising means for absorbing the difference in displacement between said driving shaft and said second intermediate lever when said second intermediate lever is rotated over a predetermined angular displacement about a substantially vertical pivot shaft.

27. A camera body in accordance with claim 25, said third intermediate lever further comprising a camming surface inclined rearwardly away from said camera mounting surface.

28. A camera body in accordance with claim 24, wherein said second intermediate lever further comprises a second bent arm, said second bent arm extending substantially vertically and having a free end which is adapted to engage said driving shaft.

29. A camera body in accordance with claim 15, wherein said driving shaft is adapted to extend outwardly from said front of said camera, said driving shaft being engaged by one end of said kinematically linking means.

30. A camera body in accordance with claim 29, wherein said driving shaft includes a pair of generally parallel flanges, wherein said one end of said kinematically linking means is positioned between said flanges.

31. A camera body in accordance with claim 29, said camera body further comprising means for selecting manual focusing or automatic focusing of said interchangeable lens.

32. A camera body in accordance with claim 31, wherein said selecting means comprises a slidable mode selection switch which is movable in a direction substantially vertically along the front of said camera body.

33. A camera body in accordance with claim 32, further comprising a plurality of slidable electrical contacts and an inclined lower camming surface which is adapted to engage said kinematically linking means.

34. A camera body in accordance with claim 15, in combination with an interchangeable lens.

35. A camera body in accordance with claim 15, wherein said driving shaft is located in one quadrant on a lower portion of said mounting surface, and said mounting surface locking member and mounting surface releasing member are positioned in another quadrant on said lower portion of said mounting surface.

36. A camera body adapted to receive an interchangeable lens in releasably engaging fashion, said camera body having a front surface and a mounting ring adjacent said front surface of said camera, wherein said mounting ring, as viewed from the front of the camera, has first and second upper quadrants and said third and fourth lower quadrants, respectively, a driving shaft comprising means for transmitting rotation of a driving motor in said camera body to a portion of an interchangeable lens when said lens is attached to said camera body, said driving shaft being located in said fourth quadrant of said mounting ring, a mounting surface locking member and a mounting surface releasing member positioned in said third quadrant of said camera body, and means for kinematically linking said driving shaft and said mounting surface releasing member, wherein a substantial portion of said kinematically linking means is positioned below said third and fourth quadrants.

37. A camera body in accordance with claim 35, in combination with an interchangeable lens.

38. A camera body adapted to selectively receive an interchangeable lens on a front surface of said camera body, said camera body comprising:

(a) an interchangeable lens mounting surface, said mounting surface comprising a mounting ring having two upper quadrants and two lower quadrants;

(b) a driving shaft normally biased outwardly from said mounting surface, said driving shaft comprising means for transmitting rotation of a driving motor within said camera body to a drive member within an interchangeable lens when a lens is mounted on said body;

(c) a mounting surface locking member normally biased outwardly from said camera body mounting surface, said mounting surface locking member being located on a first one of said lower quadrants;

(d) a mounting surface lock releasing member for retracting both said driving shaft and said mounting surface locking member from said mounting surface, said mounting surface releasing member being located within a second one of said lower quadrants; and (e) means for kinematically linking said driving shaft and said mounting surface releasing means, said kinematically linking means being located on said camera body and substantially below said mounting surface wherein said mounting surface releasing member comprises means for retracting both said driving shaft and said mounting surface locking member from an interchangeable lens when said lens is attached to said camera.

39. A camera body in accordance with claim 37 in combination with an interchangeable lens which is detachably connected to said mounting surface, said interchangeable lens including apertures for receiving said driving shaft and said mounting surface locking member, and a plurality of electrical contacts adapted to electrically contact electrical contacts on said camera body.

* * * * *